United States Patent [19]

Roll et al.

[11] 4,197,678
[45] Apr. 15, 1980

[54] COOLANT SEPARATOR

[76] Inventors: Guy Roll, 1493 Wagner St., Wantagh, N.Y. 11793; Milton B. Savage, 1780 E. 9th St., Brooklyn, N.Y. 11223

[21] Appl. No.: 923,823

[22] Filed: Jul. 12, 1978

[51] Int. Cl.² .............................................. B24B 55/02
[52] U.S. Cl. ................................ 51/267; 29/DIG. 87
[58] Field of Search ......................... 51/267, 263, 264; 29/DIG. 77, DIG. 87, DIG. 91, DIG. 94, DIG. 102; 210/305, 320

[56] References Cited

U.S. PATENT DOCUMENTS

| 2,426,817 | 9/1947 | Charlton et al. | 51/267 X |
| 2,434,679 | 1/1948 | Wagner et al. | 51/267 X |

*Primary Examiner*—Othell M. Simpson
*Assistant Examiner*—Roscoe V. Parker, Jr.
*Attorney, Agent, or Firm*—Kane, Dalsimer, Kane, Sullivan and Kurucz

[57] ABSTRACT

Coolant separator apparatus for a grinding machine of the type used to grind, shape and bevel ophthalmic lenses with a high speed grinding wheel and utilizing recirculating coolants to promote grinding speed and grinding quality with respect to both glass and plastic lenses. The apparatus includes a first tank for containing coolant used in the grinding and edging of glass lenses and a second tank for containing coolant used in the grinding and edging of plastic lenses. Pumps are provided for separately pumping coolant from each of the tanks depending on the presence of glass or plastic. A first nozzle sprays coolant from the first tank when glass is ground and a second nozzle sprays coolant from the second tank when plastic is ground. A shiftable separator is aligned with the tanks for shifting between a first position when coolant is being sprayed from the first nozzle to direct the coolant back into the first tank and a second position when coolant is being sprayed from the second nozzle to direct the coolant back into the second tank. Controls are provided for shifting the separator between the first and second positions in conjunction with the pumping of coolant from the first and second tanks respectively. The apparatus is adapted to be mounted in a grinding machine in position to maintain the two coolants separate during the grinding of plastic and glass lenses in the machine and preventing the plastic and glass coolants from intermixing and contaminating one another.

26 Claims, 4 Drawing Figures

FIG. 2
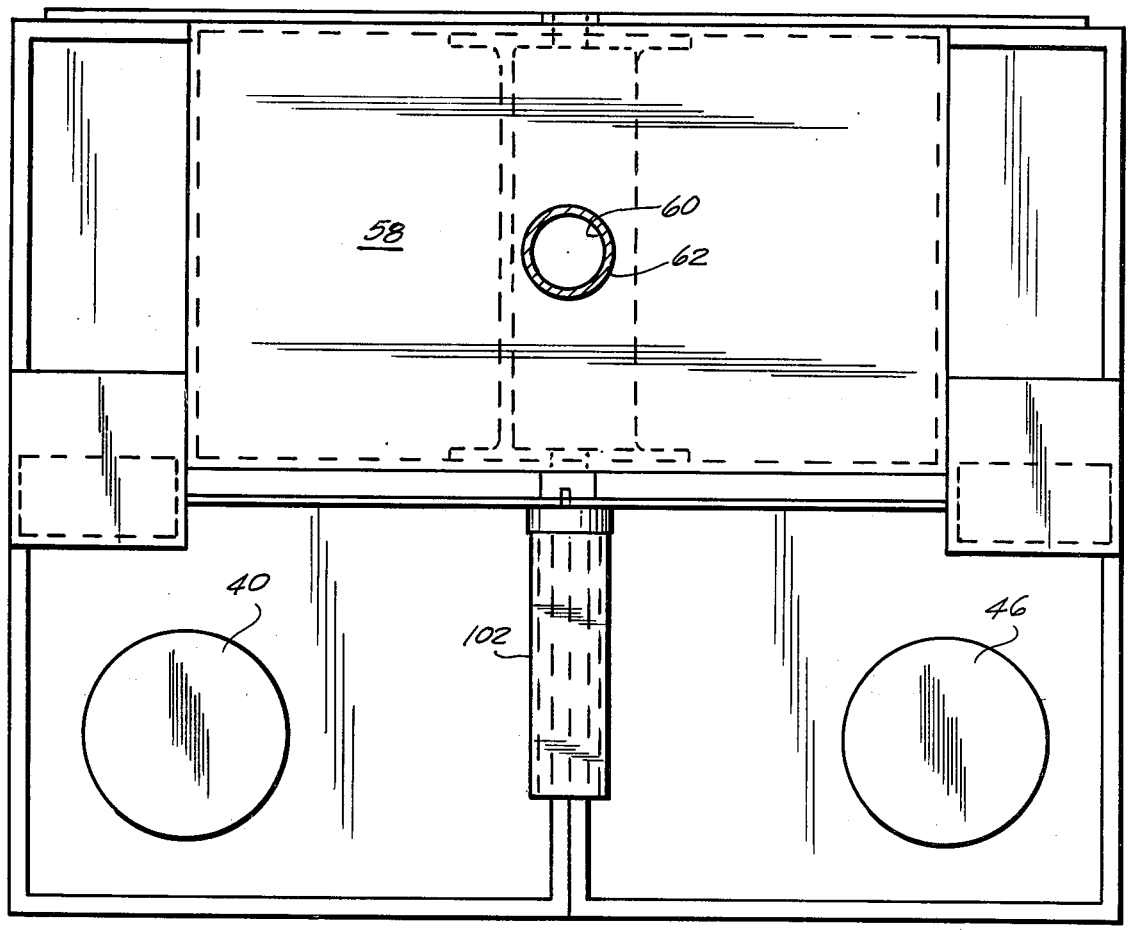
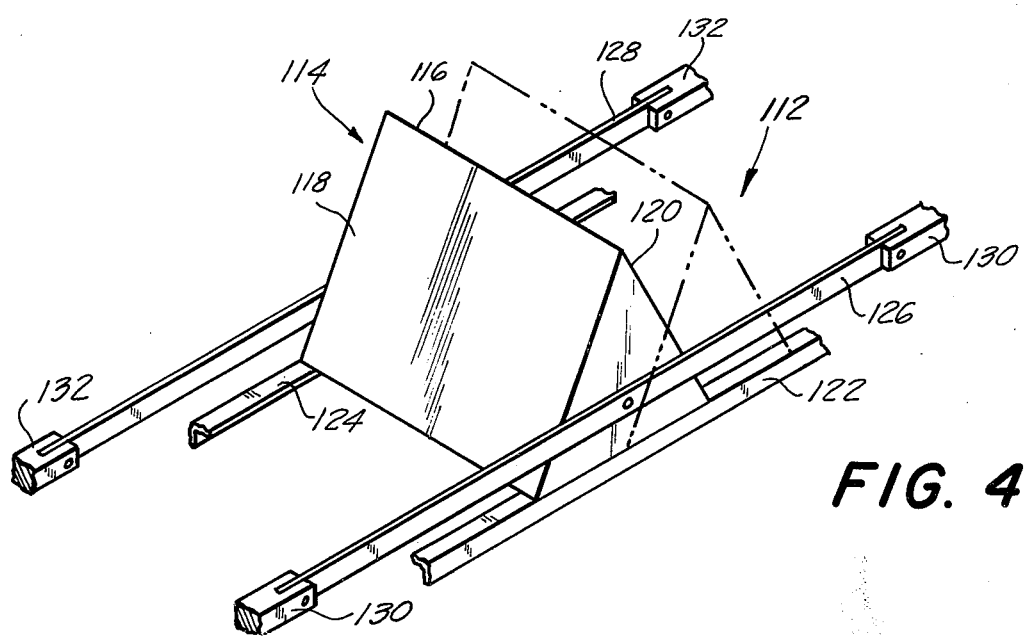
FIG. 4

COOLANT SEPARATOR

BACKGROUND OF THE INVENTION

The present invention deals with the necessity for separation of coolants used in the edge grinding of ophthalmic lenses made of glass and the coolants used in the edge grinding of ophthalmic lenses made of plastic.

Presently, the machines used to grind, shape and bevel ophthalmic lenses are equipped with diamond wheels. The use of high speed diamond wheels makes it necessary to use coolants which promote grinding speed as well as grinding quality. It has been found, however, that the best coolant for edging glass is not the best coolant for the edging of plastic lenses and vice versa. Moreover, after grinding or edging glass lenses, the coolant becomes contaminated with glass particles which have been ground away from the lens. If then a plastic lens is set for edging in the same machine without changing the coolant, the glass particles, in a state of suspension in the coolant, will impinge on the plastic lens which will then be scratched, these scratches will then appear as hairlines on the plastic lens. This is why many machine manufacturers recommend two separate machines; one for plastic and one for glass lenses.

The type of machine under consideration is disclosed in detail in U.S. Pat. No. 3,745,720.

SUMMARY OF THE INVENTION

With the above background in mind, it is among the primary objectives of the present invention to make possible the use of only one machine for plastic and glass lenses. The machine under consideration, as stated above, is described and depicted in detail in U.S. Pat. No. 3,745,720. By means of the present invention, the two coolants will be separate and be maintained in such a manner that even after heavy use, the separate coolants for glass and plastic will remain uncontaminated by each other.

The apparatus of the present invention is designed for inclusion in the machine of U.S. Pat. No. 3,745,720 in a simple and efficient manner. The coolant separator apparatus of the present invention involves the use of two pumps with two coolant tanks and two nozzles which spray the desired coolant when required. The coolants are separated when they emerge from the drainage system within the machine so that they re-enter the proper coolant tank from which they were pumped. The coolant separator element of the apparatus is interposed between the edging machine itself and the coolant tanks or reservoirs.

Among the further objectives of the invention is to provide an apparatus whereby the individual coolants go from the separate pumps through separate nozzles unto the lens being ground back through the drain of the machine into the coolant separator with a deflector or separator member in the shape of a trough, in fact two troughs back to back. The angle of the deflector or separator will control the direction of the coolant drainage. Thus, when a plastic lens is being ground, the plastic pump goes into operation and the coolant is directed by the coolant separator into the plastic coolant tank. With a glass lens, the coolant is directed into the other tank, and the coolants do not mix.

It is contemplated by the present invention that the coolant separator can be electrically powered with two solenoids in opposition to one another. The solenoids are electrically hooked up with the corresponding pumps so that when a glass lens is edged, the proper pump is activated. Conversely, a plastic lens will activate the plastic pump. The pump selector functions in conjunction with the coolant separator functions. The coolant separator is programmed to channel the proper effluent to the correct pail automatically.

Naturally there are other methods to power the separator within the context of the present invention. In some instances, the coolant separator can be activated or powered by an air cylinder or by an hydraulic cylinder.

It is also conceivable that the deflector or separator can be shifted in a variety of different manners such as by rotation about a central axle or by shifting back and forth in a shuttle-like or reciprocal motion along a horizontal plane. The shape of the separator or deflector will depend upon the type of motion desired, with the ultimate objective being to direct the fluid into one of two tanks.

It should also be kept in mind that the present separator apparatus is adapted to be mounted in other types of grinding machines which may be used for working different types and shapes of material other than plastic and glass lenses. An ultimate objective is to provide for the use of separate coolants in a single machine without intermixing or contamination of the two coolants. The coolants would be permitted to pass over the same operational work area independently during separate work periods.

In summary, a method and apparatus is provided for separating coolants in a grinding machine of the type used to grind, shape and bevel ophthalmic lenses with a high speed wheel and utilizing recirculating coolants to promote grinding speed and quality with respect to both glass and plastic lenses. A first tank is employed for containing coolant used in the grinding of glass lenses and a second tank is employed for containing coolant used in the grinding of plastic lenses. Pumps are provided for separately pumping the coolants from each of the tanks depending upon the type of lens being ground. A first nozzle is provided to spray the coolant from the first tank when glass is being used and a second nozzle is provided to spray coolant from the second tank when plastic is being used. A shiftable separator is aligned with the tanks for shifting between a first position when coolant is being sprayed from the first nozzle to direct the coolant back into the first tank and a second position when coolant is being sprayed from the second nozzle to direct the coolant back into the second tank. Control means shift the separator between the first and second positions in conjunction with the pumping of coolant from the first and second tank respectively. Mounting means is adapted to mount the coolant separator apparatus in a grinding machine to position to maintain the two coolants separate during the grinding of plastic and glass lenses in the machine and preventing the plastic and glass coolants from intermixing and contaminating one another.

With the above objectives among others in mind, reference is made to the attached drawing.

BRIEF DESCRIPTION OF THE DRAWINGS

In The Drawings

FIG. 2 is a top plan view of the apparatus of the invention;

FIG. 4 is a perspective view of an alternative coolant separator portion of the apparatus with the separator shown in one position and in phantom in another position.

DETAILED DESCRIPTION

Figure 1:
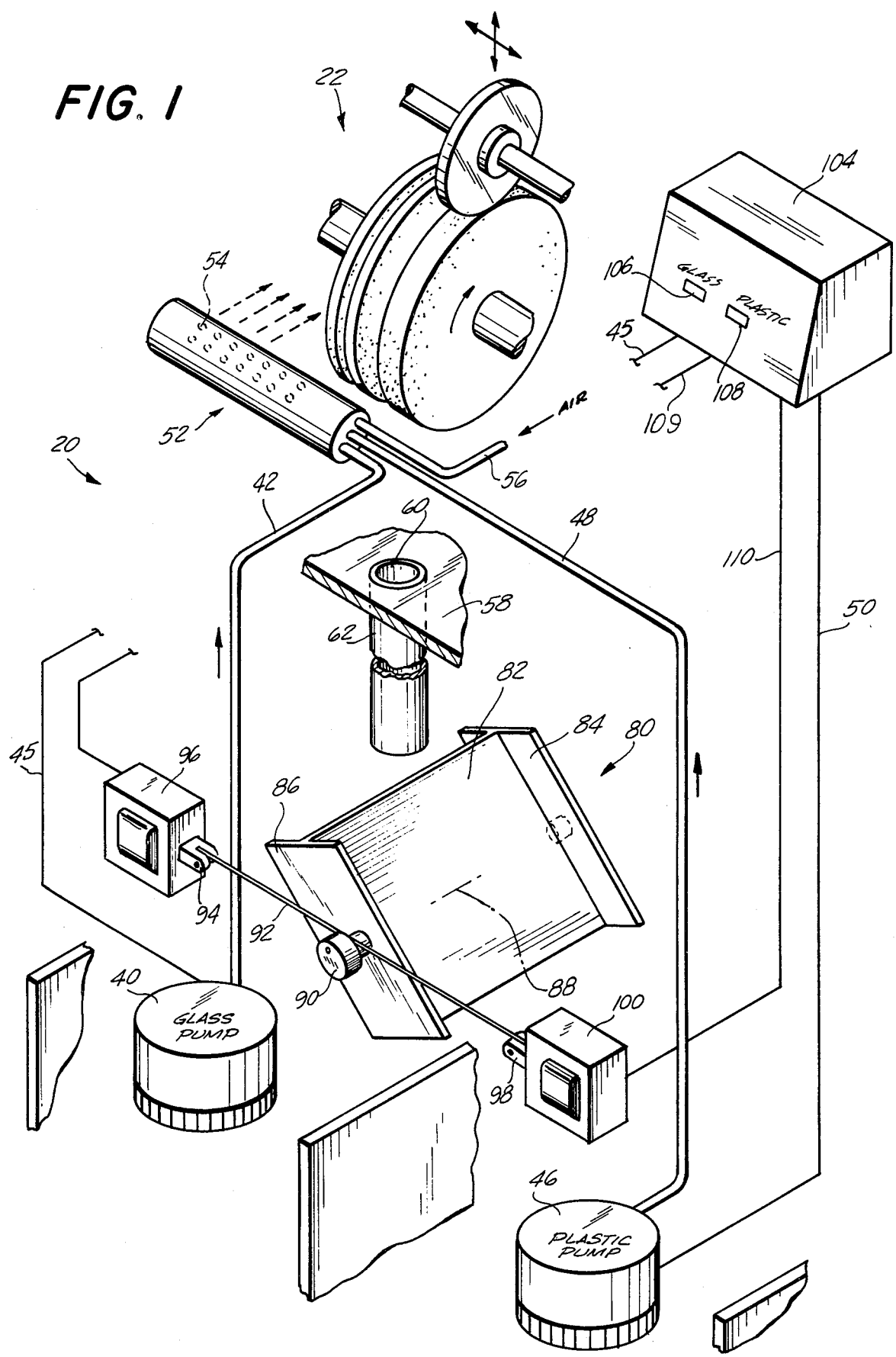
FIG. 1 is an exploded perspective view of the apparatus of the invention adapted for use in a grinding machine for grinding glass and plastic lenses.

The coolant separator apparatus 20 of the present invention is designed for mounting and incorporation in a conventional type of lens edge-grinding, finishing and beveling machine such as disclosed and depicted in detail in U.S. Pat. No. 3,745,720, discussed above. Accordingly, the details of the machine are adequately set forth in that patent and are equally applicable to use with the present invention and accordingly are incorporated herein by reference and will not be reiterated.

The only pertinent piece of that machine that need be discussed in connection with the present invention is the high speed grinding wheel assembly 22 and in that respect only in connection with its orientation and location with respect of the coolant separator 20. This arrangement is depicted in FIG. 1 of the drawing.

Figure 3:
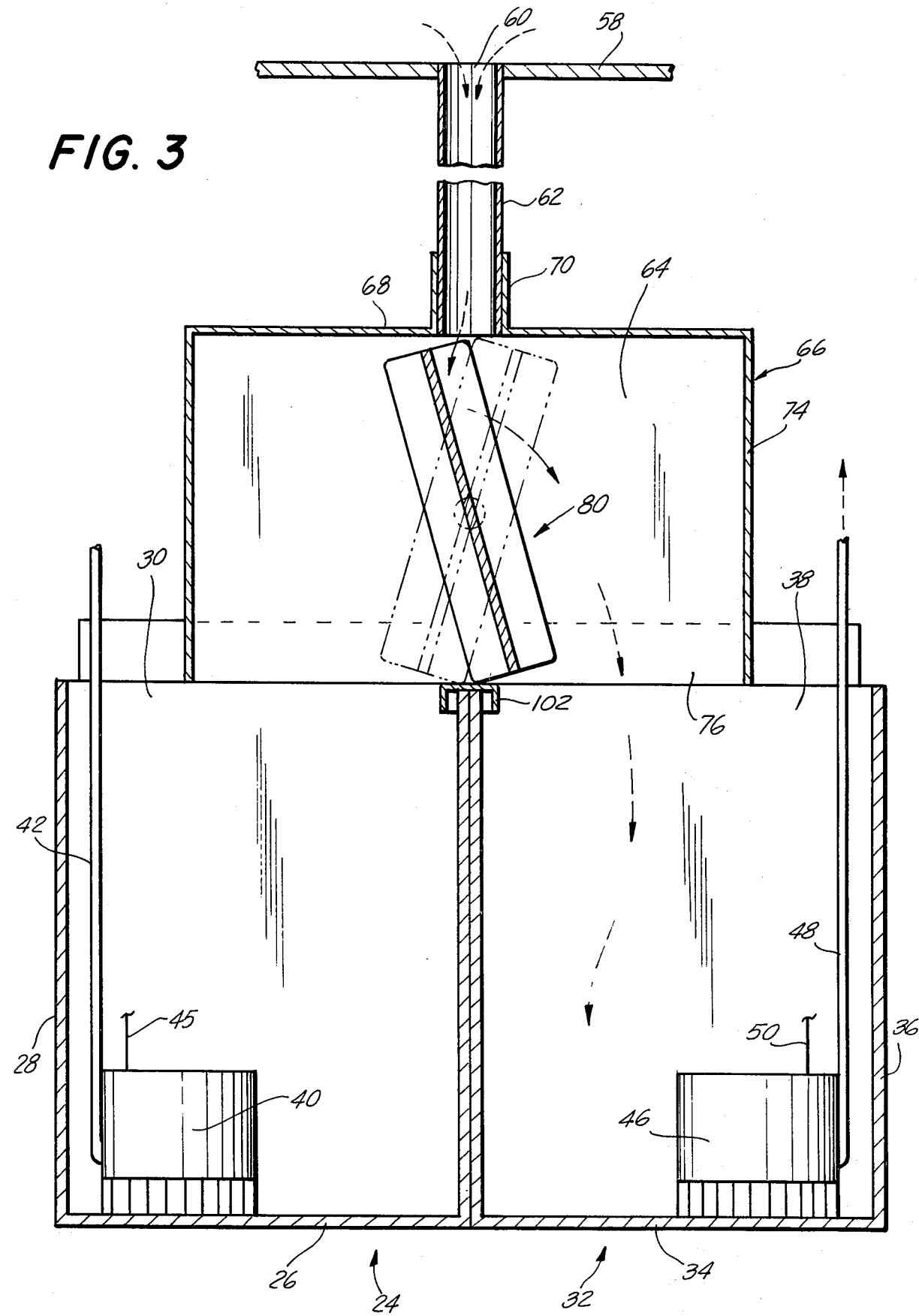
FIG. 3 is a sectional elevation view thereof with the apparatus mounted in a grinding machine and arrows showing the direction of coolant being returned through the drainage system of the machine to one of the tanks and the other position of the separator being shown in phantom.

Separator apparatus 20 as shown in detail in FIGS. 1—3 includes a first tank 24 for containing a first type of coolant such as that used in connection with the shaping and beveling of ophthalmic glass lenses. Tank 24 includes a base 26, a peripheral upstanding side wall 28, and an open top end 30. Adjacent to the first tank 24 is a second tank 32 of similar shape and configuration for holding a second coolant therein such as that used for the high speed shaping, beveling of ophthalmic plastic lenses. Tank 32 includes a base wall 34 and a peripheral side wall 36 and has an open top end 38.

Seated in the bottom of the first tank 24 is a conventional pump 40 for pumping the coolant from the tank for use. An appropriate tube or conduit 42 extends upwardly from pump 40 out of the open end 30 of tank 26. Suitable electrical connecting wire 45 is connected to the pump as part of the control means to operate the pump when it is desired to work with the grinding of a glass lens and accordingly use of the coolant from tank 26.

A similar arrangement is present in tank 32 with a conventional fluid pump 46 seated in the bottom of the interior of the tank and having a tube or conduit 48 extending upwardly therefrom for pumping of coolant from tank 32 when it is desired to work with a plastic lens. Once again, a suitable electrical connection 50 connects pump 46 with the remaining electrical control means for the system.

As shown in FIG. 1, a nozzle assembly 52 is positioned adjacent to the high speed grinding wheel assembly 22 of the edge grinding, finishing and beveling machine for the lenses and has a series of passageways therein terminating in a series of spray orifices 54. Conduit 42 from tank 26 extends into the hollow interior of nozzle assembly 52 into communication with one series of orifices. Similarly, conduit 48 extends from tank 32 into nozzle assembly 52 into communication with another series of orifices. A third set of orifices 54 in the nozzle assembly is interconnected with a third tube 56 which is interconnected with a source of air under pressure (not shown) which is used for spraying air over the grinding wheel assembly 22. Depending upon which pump is in operation, the type of coolant is determined for passage over grinding wheel assembly 22 and this is naturally dependent upon whether or not a glass lens or a plastic lens is being worked on.

A collecting pan is located in the machine beneath the grinding wheel assembly 22 where collection of coolant occurs after it has passed over the grinding wheel assembly and drops downward. The base wall 58 of that pan is located beneath grinding wheel 22 and has a drainage opening 60 therein for drainage of the coolant. The drainage opening 60 communicates with a hollow drain tube 62 which extends downward into the hollow interior 64 of a separator chamber 66. For this purpose, the drain tube 62 has an opening 68 at its bottom end. The bottom end portion of drain tube 62 is captured in hollow collar 70 forming an open neck for separator chamber 66. The separator chamber 66 has a peripheral downwardly extending skirt or wall 74 and terminates in an open bottom end 76. Thus coolant can pass through drain tube 62 and through separator chamber 66 and out through the bottom end thereof 76 by gravitational forces. Separator chamber 66 has its bottom rim mounted on appropriate supporting structure in the machine and has its open bottom end in alignment with the open upper end 30 of tank 26 and the open top end 38 of tank 32. Thus fluid falling under gravity can fall into either of the two tanks. This drainage direction is controlled by a separator deflector assembly 80 which is shiftable or rotatable to different orientations with respect to the vertical and thus forms directional means for the coolant draining through the machine.

Deflector assembly 80 includes a deflector formed by a substantially vertical plate 82 which is relatively thin and rectangular in configuration and a pair of opposing end plates 84 and 86 integrally formed with plate 82 or mounted thereon in a conventional manner to the opposing vertical edges. The end walls 84 and 86 extend laterally outward from the plate 82 so as to form end flanges on both sides thereof and at both opposing vertical edges. In this manner, the assembly 80 takes the form of a pair of troughs back to back. One side of plate 82 forms the base of one trough and the other side of plate 82 forms the base of the other trough. Intermediate the vertical ends of plate 82 is an horizontal axle 88 about which the deflector plate rotates. The axle is fixed to the surrounding supporting structure in the machine at both ends as depicted in FIG. 2 and has a cylindrical cam 90 on one end extending outwardly from the deflector plate 82. This cam 90 is keyed and connected with a rod 92. One end of rod 92 is connected to the reciprocal arm 94 of a conventional electrical solenoid 96. The other end of rod 92 is connected to the arm 98 of a similar second electrical solenoid 100 of a conventional nature. Activation of one solenoid will cause the solenoid arm to move the connecting rod 92 and accordingly the cam 90 and the axle 88 to rotate the deflector plate in one direction. Operation of the other solenoid will move the connecting rod 92 and cam and axle and plate 82 in the opposing direction and thus provide for shifting of the deflector plate assembly 80 between first and second positions.

A U-shaped seating flange 102 assists in holding the two tanks 26 and 32 in proper adjacent side by side relationship and also to form a seating surface for portions of the separator chamber structure and to provide for proper alignment of the deflector plate 80 with the two tanks. This alignment facilitates positive direction of coolant into one of the two tanks and does not permit coolant to enter the other of the tanks at the same time. Thus there is no danger of contamination of intermixing of coolants from the two separate tanks.

The system is operated by conventional electrical controls which are located in the control box 104 of the machine. A manual or automatic control system can be employed to shift between coolants depending upon whether a glass or plastic lens is being employed. For example, buttons can be used for shifting between coolants such as button 106 for glass as depicted and button 108 for plastic as depicted in FIG. 1.

The glass circuitry actuated by a master switch or control such as button 106 includes an electrical connecting wire 109, to solenoid 96 and an electrical connecting wire 45 to pump 40 in tank 26. Thus, simultaneously and automatically, the solenoid 96 will be activated to switch deflector plate assembly 80 and accordingly the separator into a position aligned for drainage of coolant into tank 26 while coolant is being pumped by pump 40 from tank 26 through conduit 42 to nozzle assembly 52 for use.

In a similar manner, button 108 forms a switch for the circuitry including an electrical connector wire 110 to solenoid 100 and wire 50 to pump 46 in the other tank 32. Thus simultaneously, when coolant is being pumped from tank 32 by pump 46 through conduit 48 to nozzle 52, solenoid 100 will redirect deflector plate assembly 80 into an orientation whereby coolant draining through the machine will be directly only into tank 32 thus providing for a complete recirculation of the coolant fluid and avoiding the danger of contamination of intermixing of coolants.

Between use of coolants when there is a change between work on a glass lens and a plastic lens, cleaning air can be directed through tube 56 and nozzle assembly 52 over the grinding wheel assembly 22 to clear away any residue that may be still present from the previous operation of the machine. Operation of the air can be included in the standard circuitry within control box 104 or can be separately controlled in a well known manner. Naturally an appropriate power source is provided for the electrical controls in box 104.

In the depicted embodiment of FIGS. 1-3, when a plastic lens is being worked on, the switch 108 is activated, and by electrical connector 50, being the pumping of coolant from tank 32 by pump 46 through conduit 48 and through nozzle assembly 52 over the high speed grinding wheel assembly 22. During the operation, the coolant will then fall into a collecting well and onto pan 58 to be directed to the opening 60 in drain tube 62. At the same time that pumping of coolant from tank 32 has been started by means of electrical connection 110, solenoid 100 is activated so that solenoid arm 98 shifts connecting rod 92 and cam 90 thus rotating plate 82 about axle 88 until it is shifted into the position depicted in FIG. 3. The separator of deflector plate assembly 80 is positioned with respect to the exit opening 68 of drain tube 62 so that fluid exiting therefrom engages with one side or the other of the vertical plate 82 and is thus directed into one of the two tanks below the plate. With the coolant for the plastic lens being used as shown by the arrows in FIG. 3, the coolant will pass through opening 60 and through drain tube 62 out through bottom opening 64 and be directed by angled plate 82 through the opening 38 in tank 32. In this manner, all of the coolant being pumped is returned to the tank from which it is drawn.

Thereafter, when a glass lens is to be worked on, the glass switch 106 is depressed and, through the simultaneous use of electrical connectors 45 and 109, the pump 40 begins to pump coolant from tank 26 through conduit 42 and through nozzle assembly 52 unto wheel assembly 22 while the solenoid 96 is activated so that this arm 98 drives cam 90 in the rotational opposite direction so that plate 82 angularly shifts about axle 88 until it is in the position shown in phantom in FIG. 3. In this arrangement, as the fluid collects through aperture 60 and down through drain tube 62 under the force of gravity it will pass through opening 68 and contact the opposite side of vertical plate 82 and be directed only into tank 26. This provides for the complete recirculation of the coolant from the tank 26 and avoids across mixing with the coolant in tank 32 and possible contamination thereof. Thus, quick and efficient separation of the coolant is effectively achieved.

Air through tube 56 can be used at any appropriate time to clean the grinding wheel assembly 22 to assist in maintaining proper work conditions.

An alternative deflector plate assembly is depicted in FIG. 4. This assembly 112 is usable in place of deflector plate assembly 80 of the embodiment of FIGS. 1-3. Instead of a rotational shifting movement between positions, there is a shuttle-like or reciprocal movement of a V-shaped member 114. Member 114 has an apex 116 at its upper end in alignment with the opening 68 from drain pipe 62. The two side walls of the V-shaped member, wall 118 and wall 120 extend downwardly and outwardly away from apex 116 toward tanks 26 and 32 respectively. Thus, when the assembly 112 is in the position depicted in FIG. 4, wall 120 will be directly beneath opening 68 in the drain pipe so that all of the coolant will deflect off that outwardly extending wall and into tank 32 in the manner shown by the arrows of FIGS. 3. If the assembly 112 is shifted reciprocally to the position shown in phantom in FIG. 4, wall 118 will be directly beneath opening 68 and the coolant exiting from the opening will be directed into tank 26. Thus, the assembly 112 operates in directing coolant into a desired tank and avoiding the intermixing and contamination of separate coolants.

V-shaped deflector 114 is slidably mounted on a pair of spaced L-rails 122 and 124 which are mounted in an appropriate manner within the machine on supporting structure above the tanks. The rails 122 and 124 are substantially parallel to one another and to receptacle connecting rods 126 and 128 which are operated by opposing pairs of solenoid arms 130 and 132 which are part of conventional solenoids such as used in the previously discussed embodiment. Thus, the control system for the embodiment of FIG. 4 is similar to that of FIGS. 1-3.

Thus the several aforenoted objects and advantages are most effectively attached. Although several somewhat preferred embodiments have been disclosed and described in detail herein, it should be understood that this invention is in no sense limited thereby and its scope is to be determined by that of the appended claims.

We claim:

1. Coolant separator apparatus for a grinding machine of the type used to grind, shape and bevel ophthalmic lenses with a high speed wheel and utilizing recirculating coolants to promote grinding speed and grinding quality with respect to both glass and plastic lenses comprising;

a first tank for containing coolant used in the grinding of glass lenses;

a second tank for containing coolant used in the grinding of plastic lenses;

pump means for separately pumping the coolant from each of the tanks depending on the presence of glass or plastic;

first nozzle means to spray the coolant from the first tank when glass is being used;

second nozzle means to spray coolant from the second tank when plastic is being used;

a shiftable separator aligned with the tanks for shifting between a first position when coolant is being sprayed from the first nozzle to direct the coolant back into the first tank and a second position when coolant is being sprayed from the second nozzle to direct the coolant back into the second tank;

control means for shifting the separator between the first and second positions in conjunction with the pumping of coolant from the first and second tanks respectively; and mounting means adapted to mount the coolant separator apparatus in a grinding machine in position to maintain the two coolants separate during the shaping and beveling of plastic and glass lenses in the machine and preventing the plastic and glass coolants from intermixing and contaminating one another.

2. The invention in accordance with claim 1 wherein there is a first pump for transferring coolant from the first tank and a second pump for transferring coolant from the second tank.

3. The invention in accordance with claim 1 wherein the first and second tanks are arranged in side by side position in the grinding machine beneath the grinding wheel of the grinding machine, a first pump in the first tank, a second pump in the second tank, a conduit connected to the pump in the first tank and to the first nozzle and a second conduit connected from the pump in the second tank to the second nozzle, the nozzles being positioned adjacent to the grinding wheel of the grinding machine and having appropriate orifices therein for the spraying of coolant onto the grinding wheel from either the first or the second tank through either the first or second conduit respectively, a drain in the grinding machine positioned below the grinding wheel to collect coolant sprayed thereover, the drain connected to the two coolant tanks therebelow, the separator located in the drain for deflecting the coolant into one of the two tanks depending upon orientation as determined by the control means.

4. The invention in accordance with claim 3 wherein the separator is in the form of a deflector plate pivotal about an axle intermediate its ends and guided by the control means to be either oriented toward the first tank or the second tank depending upon pivotal orientation about the axle so as to direct the coolant from the drain into either the first or second tank.

5. The invention in accordance with claim 4 wherein the deflector is in the shape of a pair of troughs positioned back-to-back.

6. The invention in accordance with claim 5 wherein the pair of troughs are formed by a central substantially vertically oriented plate and a pair of opposed vertical end plates extending laterally from both opposing vertical edges of the vertical plate to form vertical end flanges on both vertical edges of the plate thereby forming a pair of back-to-back substantially vertical troughs.

7. The invention in accordance with claim 2 wherein the control means includes a pair of opposed solenoids, the solenoid arm of one solenoid connected by a connecting rod to a cam on the axle of the separator and the solenoid arm of the other solenoid being connected by the connecting rod to the same cam on the axle of the separator whereby activation of one solenoid will cause the arm of the solenoid to shift the connecting rod and cam and accordingly the separator in one direction to the first position and activation of the other solenoid will cause the arm of that solenoid to shift the connecting rod and cam and accordingly the separator in a second direction by the second position, the solenoids being electrically connected to dual switch means and the pumps being electrically connected to the dual switch means, one of the dual controls of the switch means when actuated upon use of a glass lens electrically causing the first pump in the first tank to direct fluid through the first conduit and the first nozzle toward the grinding wheel and simultaneously directing the solenoids to shift the separator to the first position thus permitting the return of the coolant through the drain into the first tank, and upon the use of a plastic lens, the dual switch will be actuated to electrically operate the second pump to pump coolant from the second tank through the second conduit and second nozzle toward the grinding wheel and to cause the solenoids to shift the separator to the second position so that coolant returning through the drain means will be directed into the second tank.

8. The invention in accordance with claim 7 wherein the control means includes manually operable electrical switches.

9. The invention in accordance with claim 1 wherein the separator is in the form of a V-shaped deflector shiftable along track between the first and second positions, the apex of the V-shaped deflector directed toward the grinding wheel of the grinding machine and the diverging sides of the deflector each being angled toward the first and second tanks respectively, a pair of solenoids connected to the V-shaped metal deflector and positioned so that when one of the solenoids is activated by the control means it will shift the deflector plate from the first to the second position to direct coolant into the second tank and when the second solenoid is activated it will direct the deflector plate from the second to the first position to direct coolant into the first tank, the deflector thus having a reciprocal movement between the first and second position to separate the coolant received through the drain system from the grinding wheel.

10. A coolant separator for a grinding machine of the type used to grind, shape and bevel ophthalmic lenses with a high speed grinding wheel and utilizing recirculating coolants to promote grinding speed and grinding quality with respect to the glass and plastic lenses, a first tank in the machine for containing coolant used in the grinding of glass lenses, a second tank in the machine for containing coolant used in the grinding of plastic lenses, pumping means for separately pumping the coolant from each of the tanks depending on the presence of glass or plastic, first nozzle means to spray the coolant from the first tank when glass is being used, second nozzle means to spray coolant from the second tank when plastic is being used, control means for the pumping of coolant from the first and second tank respectively and a drainage system for returning the coolant to the tanks, the improvement comprising; a shiftable separator adapted to be mounted in the grinding machine in alignment with the nozzles and the tanks for shifting between a first position when coolant is being sprayed from the first nozzle to direct the coolant through the drainage system back into the first tank and a second position when coolant is being sprayed from the second nozzle to direct the coolant through the drainage system back into the second tank, and the separator connectable with control means to be shifted thereby between the first and second positions in conjunction with the pumping of coolant from the first and second tanks respectively.

11. The invention in accordance with claim 10 wherein there is a first pump for transferring coolant from the first tank and a second pump for transferring coolant from the second tank.

12. The invention in accordance with claim 10 wherein the first and second tanks are arranged in side by side position in the grinding machine beneath the grinding wheel of the grinding machine, a first pump in the first tank, a second pump in a second tank, a conduit connected to the pump in the first tank and to the first nozzle and a second conduit connected from the pump in the second tank to the second nozzle, the nozzles being positioned adjacent to the grinding wheel of the grinding machine and having appropriate orifices therein for the spraying of coolant onto the grinding wheel from either the first or the second tank through either the first or second conduit respectively, a drain in the grinding machine positioned below the grinding wheel to collect coolant sprayed thereover, the drain connected to the two coolant tanks therebelow, the separator located in the drain for deflecting the coolant into one of the two tanks depending upon orientation as determined by the control means.

13. The invention in accordance with claim 10 wherein the separator is in the form of a deflector plate pivotal about an axle intermediate its ends and guided by the control means to be either oriented toward the first tank or the second tank depending upon pivotal orientation about the axle so as to direct the coolant from the drain into either the first or second tank.

14. The invention in accordance with claim 13 wherein the deflector is in the shape of a pair of troughs positioned back-to-back.

15. The invention in accordance with claim 14 wherein a pair of troughs are formed by a central substantially vertically oriented plate and a pair of opposed vertical end plates extending laterally from both opposing vertical edges of the vertical plate to form vertical end flanges on both vertical edges of the plate thereby forming a pair of back-to-back substantially vertical troughs.

16. The invention in accordance with claim 11 wherein the control means includes a pair of opposed solenoids, the solenoid arm of one solenoid connected by a connecting rod to a cam on the axle of the separator and the solenoid arm of the other solenoid being connected by the connecting rod to the same cam on the axle of the separator whereby activation of one solenoid will cause the arm of the solenoid to shift the connecting rod and cam and accordingly the separator in one direction to the first position and activation of the other solenoid will cause the arm of that solenoid to shift the connecting rod and cam and accordingly the separator in a second direction of the second position, the solenoids being electrically connected to dual switch means and the pumps being electrically connected to the dual switch means, one of the dual controls of the switch means when actuated upon use of a glass lens electrically causing the first pump in the first tank to direct fluid through the first conduit and the first nozzle toward the grinding wheel and simultaneously directing the solenoids to shift the separator to the first position thus permitting the return of the coolant through the drain into the first tank, and upon the use of a plastic lens, the dual switch will be actuated to electrically operate the second pump to pump coolant from the second tank through the second conduit and second nozzle toward the grinding wheel and to cause the solenoids to shift the separator to the second position so that coolant returning through the drain means will be directed into the second tank.

17. The invention in accordance with claim 16 wherein the control means includes manually operable electrical switches.

18. The invention in accordance with claim 10 wherein a source of air pressure is provided to be interconnected to the first and second nozzle, switch means operable to direct air through the first and second nozzle and clean the grinding wheel surfaces and surrounding area of coolant thereby guarding against intermixing of coolant when switching between glass and plastic lenses.

19. The invention in accordance with claim 10 wherein the separator is in the form of a V-shaped deflector shiftable along track between the first and second positions, the apex of the V-shaped deflector directed toward the grinding wheel of the grinding machine and the diverging sides of the deflector each being angled toward the first and second tanks respectively, a pair of solenoids connected to the V-shaped metal deflector and positioned so that when one of the solenoids is activated by the control means it will shift the deflector plate from the first to the second position to direct coolant into the second tank and when the second solenoid is activated it will direct the deflector plate from the second to the first position to direct coolant into the first tank, the deflector thus having a reciprocal movement between the first and second position to separate the coolant received through the drain system from the grinding wheel.

20. A method of separating coolant in a grinding machine of the type used to grind, shape and bevel ophthalmic lenses with a high speed grinding wheel and utilizing recirculating coolants to promote grinding speed and cutting quality with respect to both glass and plastic lenses comprising; providing a first tank for containing coolant used in the grinding of glass lenses and a second tank for containing coolant used for the grinding of plastic lenses;

pumping coolant separately from each of the tanks depending on the presence of glass or plastic through a first nozzle means to spray the coolant from the first tank when glass is being used and through a second nozzle means to spray coolant from the second tank when plastic is being used;

directing the coolant sprayed from the first nozzle back into the first tank and the coolant from the second nozzle back into the second tank;

controlling the direction of fluid sprayed from the first and second nozzle in conjunction with the pumping of coolant from the first and second tank respectively so that the two coolants are maintained separate during the use of plastic and glass lenses respectively in the machine and preventing the plastic and glass coolants from intermixing and contaminating one another.

21. The invention in accordance with claim 20 wherein coolant is transferred from the first tank by a first pump and transferred from the second tank by a second pump.

22. The invention in accordance with claim 20 wherein the coolant collected after having been sprayed into the grinding machine is passed through a drain and directed from the drain into one of the two adjacent coolant tanks with coolant from the first tank being returned to the first tank and coolant from the second tank being returned to the second tank.

23. The invention in accordance with claim 20 wherein the coolant is directed to the respective tanks by means of a separator shiftable between a first position for directing coolant from the first tank back into the second tank and a second position for directing coolant from the second tank back into the second tank.

24. The invention in accordance with claim 23 wherein the separator is in the form of a deflector plate pivotal about an axle intermediate its ends and adapted to be oriented either toward the first tank or the second tank depending upon the pivotal orientation about the axle so as to direct the coolant into the first or second tank as desired.

25. The invention in accordance with claim 23 wherein the shifting of the separator between the first and second positions is accomplished by electrical control means which simultaneously operates the appropriate pumping action so that as coolant is pumped from one tank it is directed back to the same tank and when coolant is pumped from the other tank it will be returned to the other tank.

26. The invention in accordance with claim 23 wherein the separator is in the form of a V-shaped deflector shiftable along a track between the first and second positions, the apex of the V-shaped deflector directed toward the grinding wheel of the grinding machine and the diverging sides of the deflector each being angled toward the first and second tanks respectively, the deflector being reciprocally shiftable between the first and second positions in position to direct coolant back into either the first or second tank as desired.

* * * * *